(12) United States Patent
Jonas et al.

(10) Patent No.: US 10,277,751 B2
(45) Date of Patent: Apr. 30, 2019

(54) METHOD AND SYSTEM FOR MONITORING AND ADMINISTRATING COMMUNICATION SERVICES

(71) Applicant: IDT Telecom, Inc., Newark, NJ (US)

(72) Inventors: Samuel Jonas, Englewood, NJ (US); Gabriel Schecter, Cedarhurst, NY (US)

(73) Assignee: IDT Telecom, Inc., Newark, NJ (US)

( * ) Notice: Subject to any disclaimer, the term of this patent is extended or adjusted under 35 U.S.C. 154(b) by 0 days.

(21) Appl. No.: 16/003,843

(22) Filed: Jun. 8, 2018

(65) Prior Publication Data

US 2018/0359367 A1    Dec. 13, 2018

Related U.S. Application Data

(60) Provisional application No. 62/517,046, filed on Jun. 8, 2017.

(51) Int. Cl.
| | |
|---|---|
| *H04M 11/00* | (2006.01) |
| *H04M 15/28* | (2006.01) |
| *H04M 17/00* | (2006.01) |
| *H04M 15/00* | (2006.01) |
| *H04W 4/24* | (2018.01) |

(52) U.S. Cl.
CPC .......... *H04M 15/28* (2013.01); *H04M 15/61* (2013.01); *H04M 15/8005* (2013.01); *H04M 15/883* (2013.01); *H04M 17/35* (2013.01); *H04W 4/24* (2013.01)

(58) Field of Classification Search
CPC ........ H04M 15/28; H04M 15/61; H04W 4/24
USPC ............. 455/408, 407, 406, 405, 414.1, 418
See application file for complete search history.

(56) References Cited

U.S. PATENT DOCUMENTS

| | | | |
|---|---|---|---|
| 2012/0220260 A1* | 8/2012 | Bandera ................ | H04M 15/00 455/405 |
| 2014/0136411 A1* | 5/2014 | Cho ........................ | G06F 21/35 705/44 |
| 2015/0287001 A1* | 10/2015 | Weiss ................... | G06Q 20/102 705/40 |

* cited by examiner

*Primary Examiner* — Nghi H Ly
(74) *Attorney, Agent, or Firm* — Oblon, McClelland, Maier & Neustadt, L.L.P.

(57) ABSTRACT

Customer devices (e.g., mobile cellular phones) are configured to interact with a communications service provider (and optionally an administration and monitoring system). A customer device is configured as a "capped pay-as-you-go" device in which the customer associated with the device is charged no more than a pre-arranged amount in any given (dynamic or static) billing period. For example, if $50 is the "capped" amount for a billing period, a user might pay $10 for using 1 gigabyte of data in a billing period, or it might pay $50 whether it used 5 gigabytes of data or 10 gigabytes of data in a single billing period.

22 Claims, 1 Drawing Sheet

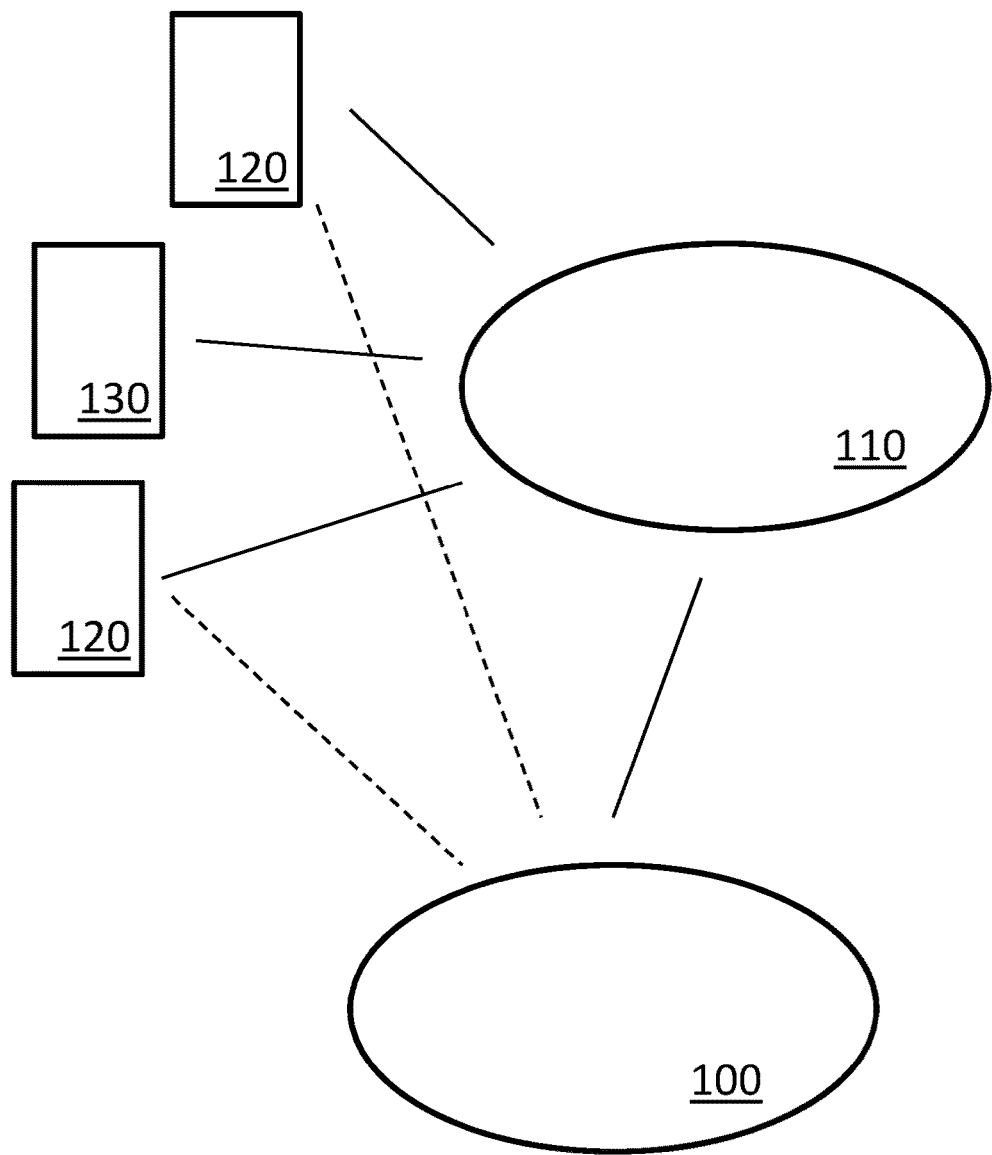

METHOD AND SYSTEM FOR MONITORING AND ADMINISTRATING COMMUNICATION SERVICES

FIELD OF INVENTION

The present invention is directed to a method and system for monitoring and administrating communication services, and, in one embodiment, to a method and system for monitoring and administrating cellular voice and/or data services in a mobile or fixed cellular network.

DISCUSSION OF THE BACKGROUND

A number of cellular telephone services provide a number of different calling and data plans, including subscription plans and pay-as-you-go plans. In some known subscription plans, for a pre-specified monthly subscription cost (e.g., $50/month), the customer is provided with a pre-specified number of minutes (e.g., 200 minutes/month) or a pre-specified amount of data usage (e.g., 10 GB/month of data). (As used herein, "pre-specified units" will be used as the general term for either a pre-specified number of minutes or a pre-specified amount of data usage.) Known subscription plans with an amount of pre-specified units generally fall into two categories: (1) capped plans where a customer is not allowed to go over its pre-specified units (in order to control costs) and (2) "pre-specified+" plans where after the customer has used its pre-specified units additional units (or blocks of units) are charged at a known rate.

Alternatively, some subscription plans are "unlimited" plans where a customer is provided an unlimited amount of units for its subscription (e.g., weekly, monthly, quarterly or yearly). In one embodiment, the service provider provides differing levels of service as the number of units used by the customer exceeds one or more thresholds (e.g., by providing slower, but still unlimited data service over the first 10 GB of data used in a subscription period). In another embodiment, the level of service is the same for the whole subscription period.

Some known cellular providers also provide a pay-as-you-go service where the user is not charged a (e.g., monthly) subscription, but the customer pays as the units are used (typically at a higher per-unit cost than would be available through a subscription). This billing method is often used by customers with smaller unit needs, and such services may either be pre-paid (often with the ability to "top-up" or add more units) or post-paid (where the customer gets a bill for the usage at the end of the billing period). However, using the pay-as-you-go service, there has been no way to control costs when usage is higher than an expected maximum. This causes a customer to either have to buy additional units to continue communicating (in a pre-paid environment) or risk having a large bill (in a post-paid environment).

BRIEF DESCRIPTION OF THE DRAWINGS

The following description, given with respect to the attached drawings, may be better understood with reference to the non-limiting examples of the drawing, wherein:

FIG. 1 is a block diagram of a communications environment including plural customer devices, a communications service provider and an administration and monitoring system.

DISCUSSION OF THE PREFERRED EMBODIMENTS

Turning to FIG. 1, plural customer devices (120/130) interact with a communications service provider 110 to receive communication services (e.g., cellular voice service and/or cellular data services). At least one customer device 130 utilizes a known pay-as-you-go or subscription service as described above. However, one or more customer devices 120 are configured according to the present invention to interact with at least the communications service provider 110 (and optionally the administration and monitoring system 100 implemented as a computer system/server providing functionality through computer instructions stored in a computer memory accessible by at least one computer processor). In such a configuration, a customer device 120 is configured as a "capped pay-as-you-go" device in which the customer associated with the device is charged no more than a pre-arranged amount in any given billing period. (As described in greater detail below, the billing period can be either periodic, such as monthly, or aperiodic, such as a fixed period of time after a first communication has been made in a period.) For example, if $50 is the "capped" amount for a billing period, a user might pay $10 for using 1 gigabyte of data in a billing period, or it might pay $50 whether it used 5 gigabytes, 10 gigabytes, or 20 gigabytes of data in a single billing period.

Customer devices 120 configured as "capped pay-as-you-go" devices can be configured to operate in any of the manners described below without departing from the teachings of this application. The customer device using a "capped pay-as-you-go" system can start using the system in a number of ways. According to a first embodiment, the customer is not charged an up-front fee at all to use the system. The device 120 simply uses a capped pay-as-you-go configuration where number of used units is reset when the billing period ends. In this first embodiment, the billing period restarts at the same time every month (e.g., on the monthly anniversary date of when the user registered). Such a periodic configuration is referred to herein as a "static billing period."

In a second embodiment, the customer again is not charged an up-front fee, but the billing period is a "dynamic billing period" such that it is for a fixed period after the customer makes its first call (or data transfer) in that billing period. Thus, the next billing period does not begin until the customer makes its next call (or data transfer) after the end of the previous billing cycle. For example, the customer begins a 30-day period on Jan. 2, 2017 when it placed its first call (or made its first data transfer) on Jan 2, 2017. However, the customer only makes calls (or has data transfers) on the first day in the 30-day period and doesn't use the system again until Mar. 1, 2017. So, the customer's second 30-day period does not begin until Mar. 1, 2017.

According to a third embodiment, at the beginning (front-loaded) or end (back-loaded) of a static billing period the customer is charged a small monthly fee (e.g., $5) to use the system, but pays a per-unit fee up until it hits the maximum. The monthly fee would hit at the same time monthly regardless of usage. So, in a front-loaded configuration, the customer registers on Jan. 3, 2017, and pays $5 on that day and pays $5 again on Feb. 3, 2017, even if the customer did not use the system in January and even if the customer did not place its first call (or make its first data transfer) until Mar. 2, 2017. In a back-loaded configuration, the customer registers on Jan. 3, 2017, and pays $5 on Feb. 2, 2017 and pays $5 again on Mar. 2, 2017, even if the customer did not use the system in January and even if the customer did not place its first call (or make its first data transfer) until Mar. 3, 2017.

According to a fourth embodiment, the customer gets assessed an initial fixed fee at the beginning of each dynamic billing period and then pays for usage up to a maximum fee in the dynamic billing period but does not have to pay that initial fee again until it next uses the system outside of the first period. For example, the user pays $5 for a 30-day period on Jan. 2, 2017 when it placed its first call (or make its first data transfer) on Jan. 2, 2017. However, the customer only makes one call (or has only one transfer) on the first day of the 30-day period and does not use the system again until Mar. 1, 2017. So, the customer "misses" paying anything in February and is charged the $5 fee for the next 30-day period starting on Mar. 1, 2017 (which isn't matched to any static billing period anniversary date).

Each of the four embodiments above also has sub-embodiments based on whether there are or there are not volume discounts within the billing period, whether static or dynamic. For example, in one sub-embodiment, the cost per unit remains fixed throughout the billing period. In an alternate sub-embodiment, the cost per unit changes (increases or decreases) during the billing cycle based on how many units have been purchased during the billing period. For example, when a maximum per-period cost is $50, the per-unit charge decreases per unit (e.g., from $10/GB to $5/GB) after the customer hits a first threshold ($25) and thereafter either stays fixed until the maximum per-period cost (e.g., $50) is reached or may decrease yet again (e.g., from $5/GB to $2.5/GB) after the customer hits one or more subsequent thresholds (e.g., $40 or $40 and $45).

In the environment of FIG. 1, one or more customer devices 120 are configured according to the present invention to interact with at least the communications service provider 110 (and optionally the administration and monitoring system 100). The communications service provider 110 provides the communications services (e.g., network access and authentication) to the customer devices 120, and the communications service provider 110 interacts with the administration and monitoring system 100 (which is either provided by the communications service provider 110 or by a third party, such as a mobile virtual network operator (MVNO)) to control billing and usage. In one such configuration, a communications service provider 110 periodically informs an MVNO acting as an administration and monitoring system 100 about customer devices 120 that are associated with the MVNO. This enables the MVNO to inform the communications service provider 110 whether a customer device 120 should continue to be given service and enables the MVNO to track how much to debit from the account of a customer device 120 based on usage.

Periodically (e.g., on a daily basis), the MVNO determines which of the devices 120 have billing periods that are starting and/or stopping so that it may reset usage statistics and perform billing (e.g., front-loaded or back-loaded billing). In addition, at the beginning of each period, the MVNO informs the communications service provider 110 that each of the MVNO's devices that are beginning a new period should be set to a "pay-as-you-go" device for which usage information should be reported to the MVNO. For dynamic billing devices that have reached the end of their billing period, the MVNO informs the communications service provider 110 that those devices are inactive. The communications service provider 110 must then request authorization to reactivate those devices the next time that they attempt to make a call so that a new billing cycle can begin. Alternatively, as shown by the dashed lines between the administration and monitoring system 100 (e.g., MVNO) and the device 120, the devices 120 may optionally have an out-of-band method (e.g., via an app over WiFi) of reactivating themselves when their users wish to start a new dynamic billing cycle.

In addition, the administration and monitoring system 100 and communications service provider 110 are in communication to enable the administration and monitoring system 100 to be informed about how many units are being consumed by each device such that the administration and monitoring system 100 knows how much to debit from the accounts of the corresponding customers. As discussed above, the per-unit cost may change over the billing period.

In addition, the administration and monitoring system 100 and communications service provider 110 are in communication to enable the administration and monitoring system 100 to be informed when a device has used sufficient units to now be at the capped or maximum cost for the billing period. At that point, the administration and monitoring system 100 informs the communications service provider 110 that the communications service provider 110 should begin to treat the device as a device that is allowed unlimited units until it is reset at the end of its billing period. When a device is treated as unlimited, preferably the administration and monitoring system 100 and communications service provider 110 still exchange per-device usage information, e.g., for fraud protection. By having the administration and monitoring system 100 separately track as "unlimited units" those units used while a device is in the "unlimited" state (as opposed to the allowed per-period minutes), the administration and monitoring system 100 can provide "mid-period specials" (e.g., unlimited calling on Mother's Day) that do not use a device's allowed per-period minutes simply by setting devices to unlimited for a day and resetting them back to capped pay-as-you-go the next day.

While certain configurations of structures have been illustrated for the purposes of presenting the basic structures of the present invention, one of ordinary skill in the art will appreciate that other variations are possible which would still fall within the scope of the appended claims.

The invention claimed is:

1. A computer-implemented system for administering and monitoring communications services provided by a communications service provider, comprising:
   an administration and monitoring system including computer code for performing the steps of:
      determining a start of a billing period for a customer device serviced by the communications service provider;
      tracking units used by the customer device during the billing period;
      charging a per-unit fee for usage of the communications services provided by a communications service provider up to a threshold number of units used by the customer device in the billing period; and
      providing additional units of communications services used by the customer device in the billing period beyond the threshold number of units at no additional charge to the customer device.

2. The computer-implemented system as claimed in claim 1, wherein the communications service provider is a cellular communications service provider providing cellular communication services.

3. The computer-implemented system as claimed in claim 1, wherein the billing period is a periodic billing period.

4. The computer-implemented system as claimed in claim 3, wherein the periodic billing period is a monthly billing period.

5. The computer-implemented system as claimed in claim 1, wherein the billing period is an aperiodic billing period.

6. The computer-implemented system as claimed in claim 1, wherein determining a start of a billing period for a customer device serviced by the communications service provider comprises determining a first date after and end of a previous billing period of the customer device that the communications service provider first provided service to the customer device.

7. The computer-implemented system as claimed in claim 1, wherein the administration and monitoring system further includes computer code for charging a per-period fee at the start of the billing period for the customer device serviced by the communications service provider.

8. The computer-implemented system as claimed in claim 7, wherein the billing period is a periodic billing period.

9. The computer-implemented system as claimed in claim 8, wherein the periodic billing period is a monthly billing period.

10. The computer-implemented system as claimed in claim 7, wherein the billing period is an aperiodic billing period.

11. The computer-implemented system as claimed in claim 7, wherein determining a start of a billing period for a customer device serviced by the communications service provider comprises determining a first date after and end of a previous billing period of the customer device that the communications service provider first provided service to the customer device.

12. A computer-implemented method for administering and monitoring communications services provided by a communications service provider, comprising:
    determining a start of a billing period for a customer device serviced by the communications service provider;
    tracking units used by the customer device during the billing period;
    charging a per-unit fee for usage of the communications services provided by a communications service provider up to a threshold number of units used by the customer device in the billing period; and
    providing additional units of communications services used by the customer device in the billing period beyond the threshold number of units at no additional charge to the customer device.

13. The computer-implemented method as claimed in claim 12, wherein the communications service provider is a cellular communications service provider providing cellular communication services.

14. The computer-implemented method as claimed in claim 12, wherein the billing period is a periodic billing period.

15. The computer-implemented method as claimed in claim 14, wherein the periodic billing period is a monthly billing period.

16. The computer-implemented method as claimed in claim 12, wherein the billing period is an aperiodic billing period.

17. The computer-implemented method as claimed in claim 12, wherein determining a start of a billing period for a customer device serviced by the communications service provider comprises determining a first date after and end of a previous billing period of the customer device that the communications service provider first provided service to the customer device.

18. The computer-implemented method as claimed in claim 12, further comprising charging a per-period fee at the start of the billing period for the customer device serviced by the communications service provider.

19. The computer-implemented method as claimed in claim 18, wherein the billing period is a periodic billing period.

20. The computer-implemented method as claimed in claim 19, wherein the periodic billing period is a monthly billing period.

21. The computer-implemented method as claimed in claim 18, wherein the billing period is an aperiodic billing period.

22. The computer-implemented method as claimed in claim 18, wherein determining a start of a billing period for a customer device serviced by the communications service provider comprises determining a first date after and end of a previous billing period of the customer device that the communications service provider first provided service to the customer device.

\* \* \* \* \*